US012677089B2

(12) United States Patent
Che et al.

(10) Patent No.: US 12,677,089 B2
(45) Date of Patent: Jul. 7, 2026

(54) CHARGING BOX, CHARGING BOX CONTROL METHOD AND APPARATUS, EARPHONE ASSEMBLY, AND READABLE STORAGE MEDIUM

(71) Applicant: VIVO MOBILE COMMUNICATION CO., LTD., Guangdong (CN)

(72) Inventors: Liangxian Che, Guangdong (CN); Yang Zhang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 153 days.

(21) Appl. No.: 18/436,301

(22) Filed: Feb. 8, 2024

(65) Prior Publication Data

US 2024/0179443 A1 May 30, 2024

Related U.S. Application Data

(63) Continuation of application No. PCT/CN2022/113205, filed on Aug. 18, 2022.

(30) Foreign Application Priority Data

Aug. 20, 2021 (CN) .......................... 202110959595.3

(51) Int. Cl.
| | |
|---|---|
| *H04R 1/02* | (2006.01) |
| *H02J 7/42* | (2026.01) |
| *H02J 7/70* | (2026.01) |
| *H04R 1/1025* | (2026.01) |

(52) U.S. Cl.
CPC .............. *H04R 1/1025* (2013.01); *H02J 7/42* (2026.01); *H02J 7/731* (2026.01); *H04R 2420/07* (2013.01)

(58) Field of Classification Search
CPC ...... H04R 1/10; H04R 1/1016; H04R 1/1025; H04R 1/1041; H04R 2420/07; H02J 7/0044; H02J 7/00034; H02J 7/0042; H02J 7/0045; A45C 11/00
See application file for complete search history.

(56) References Cited

U.S. PATENT DOCUMENTS

| | | |
|---|---|---|
| 9,635,696 B1 | 4/2017 | Liu |
| 10,904,673 B1 * | 1/2021 | Zhang .................. H04R 25/602 |
| 2016/0202726 A1 | 7/2016 | Seen et al. |
| 2020/0304899 A1 | 9/2020 | Cramer et al. |

(Continued)

FOREIGN PATENT DOCUMENTS

| | | |
|---|---|---|
| CN | 103067055 A | 4/2013 |
| CN | 104683002 A | 6/2015 |

(Continued)

*Primary Examiner* — Jason R Kurr
(74) *Attorney, Agent, or Firm* — Price Heneveld LLP

(57) ABSTRACT

This application discloses a charging box, a charging box control method and apparatus, an earphone assembly, and a readable storage medium, and pertains to the technical field of wireless earphones. The charging box includes a box body, where the box body is provided with a first light-emitting area; a cover body, where the cover body is rotatably connected to the box body; and a light source, where the light source is arranged in the box body, and in a case that the cover body and the box body form a first angle, light emitted from the light source is exported through the first light-emitting area.

19 Claims, 3 Drawing Sheets

(56)    References Cited

U.S. PATENT DOCUMENTS

| | | | | |
|---|---|---|---|---|
| 2021/0289282 A1* | 9/2021 | Onizuka | ............... | H04R 1/1016 |
| 2022/0217463 A1* | 7/2022 | Panecki | ................ | H04R 1/1041 |
| 2023/0084210 A1* | 3/2023 | Kheraj | ...................... | A61L 2/24 |
| | | | | 381/74 |

FOREIGN PATENT DOCUMENTS

| | | | |
|---|---|---|---|
| CN | 207151940 | U | 3/2018 |
| CN | 207543308 | U | 6/2018 |
| CN | 108901006 | A | 11/2018 |
| CN | 109922401 | A1 | 6/2019 |
| CN | 209345351 | U | 9/2019 |
| CN | 110602599 | A | 12/2019 |
| CN | 111010643 | A | 4/2020 |
| CN | 210272132 | U | 4/2020 |
| CN | 210609633 | U | 5/2020 |
| CN | 210958742 | U | 7/2020 |
| CN | 211670657 | U | 10/2020 |
| CN | 112040457 | A | 12/2020 |
| CN | 212392975 | U | 1/2021 |
| CN | 212486161 | U | 2/2021 |
| CN | 213043824 | U | 4/2021 |
| CN | 112770210 | A | 5/2021 |
| CN | 213186474 | U | 5/2021 |
| CN | 113676813 | A | 11/2021 |
| GB | 1548145 | A | 7/1979 |
| JP | 2004279655 | A | 10/2004 |
| KR | 20130031104 | A | 3/2013 |
| KR | 101602306 | B1 | 3/2016 |
| KR | 101772887 | B1 | 8/2017 |
| WO | 2021043160 | A1 | 3/2021 |

* cited by examiner

CHARGING BOX, CHARGING BOX CONTROL METHOD AND APPARATUS, EARPHONE ASSEMBLY, AND READABLE STORAGE MEDIUM

CROSS-REFERENCE TO RELATED APPLICATIONS

The present invention is a continuation application of International Application No. PCT/CN2022/113205, filed on Aug. 18, 2022. International Application No. PCT/CN2022/113205 claims priority to Chinese Patent Application No. 202110959595.3, filed with the China National Intellectual Property Administration on Aug. 20, 2021 and entitled "CHARGING BOX, CHARGING BOX CONTROL METHOD AND APPARATUS, EARPHONE ASSEMBLY, AND READABLE STORAGE MEDIUM". Each of the above-listed applications is incorporated herein by reference in its entirety.

TECHNICAL FIELD

This application pertains to the technical field of wireless earphones, and in particular, to a charging box, a charging box control method and apparatus, an earphone assembly, and a readable storage medium.

BACKGROUND

In today's society, various electronic products emerge in endlessly. To make users enjoy convenience brought by electronic products without disturbing surrounding environments, a function of earphones cannot be ignored. With the rapid development of science and technology in recent years, wireless earphones have been widely used in people's lives. Wireless earphones are favored by users because they are easy to carry and have no wire hassles. Such earphones can avoid various inconveniences in use of traditional wired earphones.

The traditional wireless earphones are used in conjunction with the charging box. The charging box can store the wireless earphones and charge the wireless earphones, but functions of the charging box are relatively simple.

In addition, when using the wireless earphones, the user must pair the wireless earphones with the electronic device, so that the wireless earphones can communicate with the electronic device. The pairing operation between the traditional wireless earphones and the electronic device is cumbersome. For example, the user needs to open the charging box, switch the charging box to the pairing mode, in addition, turn on the Bluetooth of the electronic device, and find the wireless earphones that needs to be used among many devices searched by the Bluetooth before the pairing operation. This cumbersome pairing operation will cause a pairing time of the wireless earphones to be long, especially when the user is not familiar with the operation of the electronic device, there are often pairing failures and the pairing operation has to be repeated until the pairing is successful. This will further prolong the pairing time of the wireless earphones and cause the user to have poor experience in the process of using the wireless earphones.

SUMMARY

According to a first aspect, an embodiment of this application provides a charging box, including:

a box body, where the box body is provided with a first light-emitting area;

a cover body, where the cover body is rotatably connected to the box body; and a light source, where the light source is arranged in the box body, where in a case that the cover body and the box body form a first angle, light emitted from the light source is exported through the first light-emitting area.

According to a second aspect, an embodiment of this application provides an earphone assembly, including wireless earphones and the charging box according to the first aspect, and the wireless earphones can be stored in the charging box and electrically connected to the charging box.

According to a third aspect, an embodiment of this application provides a charging box control method, applied to the charging box according to the first aspect, and including:

in a case that a cover body and a box body form a first angle, controlling a light source to emit light, where in a case that an electronic device receives the light, the electronic device performs an operation corresponding to the light.

According to a fourth aspect, an embodiment of this application provides a charging box control apparatus, applied to the control method according to the third aspect, and including: a control module, configured to: in a case that a cover body and a box body form a first angle, control a light source to emit light, where in a case that an electronic device receives the light, the electronic device performs an operation corresponding to the light.

According to a fifth aspect, an embodiment of this application provides a charging box, including a processor, a memory, and a program or an instruction stored in the memory and executable on the processor, and when the program or the instruction is executed by the processor, steps of the control method according to the third aspect are implemented.

According to a sixth aspect, an embodiment of this application provides a readable storage medium, where the readable storage medium stores a program or an instruction, and the program or the instruction is executed by a processor to implement steps of the control method according to the third aspect.

According to a seventh aspect, an embodiment of this application provides a chip, where the chip includes a processor and a communications interface, the communications interface is coupled to the processor, and the processor is configured to run a program or an instruction to implement the control method according to the third aspect.

REFERENCE NUMERALS

100—box body;
200—cover body, 210—rotating shaft, 220—pressing portion;
300—light source;
400—first light guide member, 410—magnetic portion, 420—avoidance hole, 430—disc-shaped portion, 440—light guide column;
500—second light guide member;
600—driving mechanism, 610—magnetic driving member, 611—driving slope, 620—first elastic member, 630—second elastic member.

DESCRIPTION OF EMBODIMENTS

The following clearly describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that the data used in such a way is interchangeable in proper circumstances so that the embodiments of this application can be implemented in an order other than the order illustrated or described herein. In addition, in this specification and the claims, "and/or" represents at least one of connected objects, and a character "/" generally represents an "or" relationship between associated objects.

With reference to the accompanying drawings, a charging box provided in the embodiments of this application is described in detail by using specific embodiments and application scenarios thereof.

Figure 1:
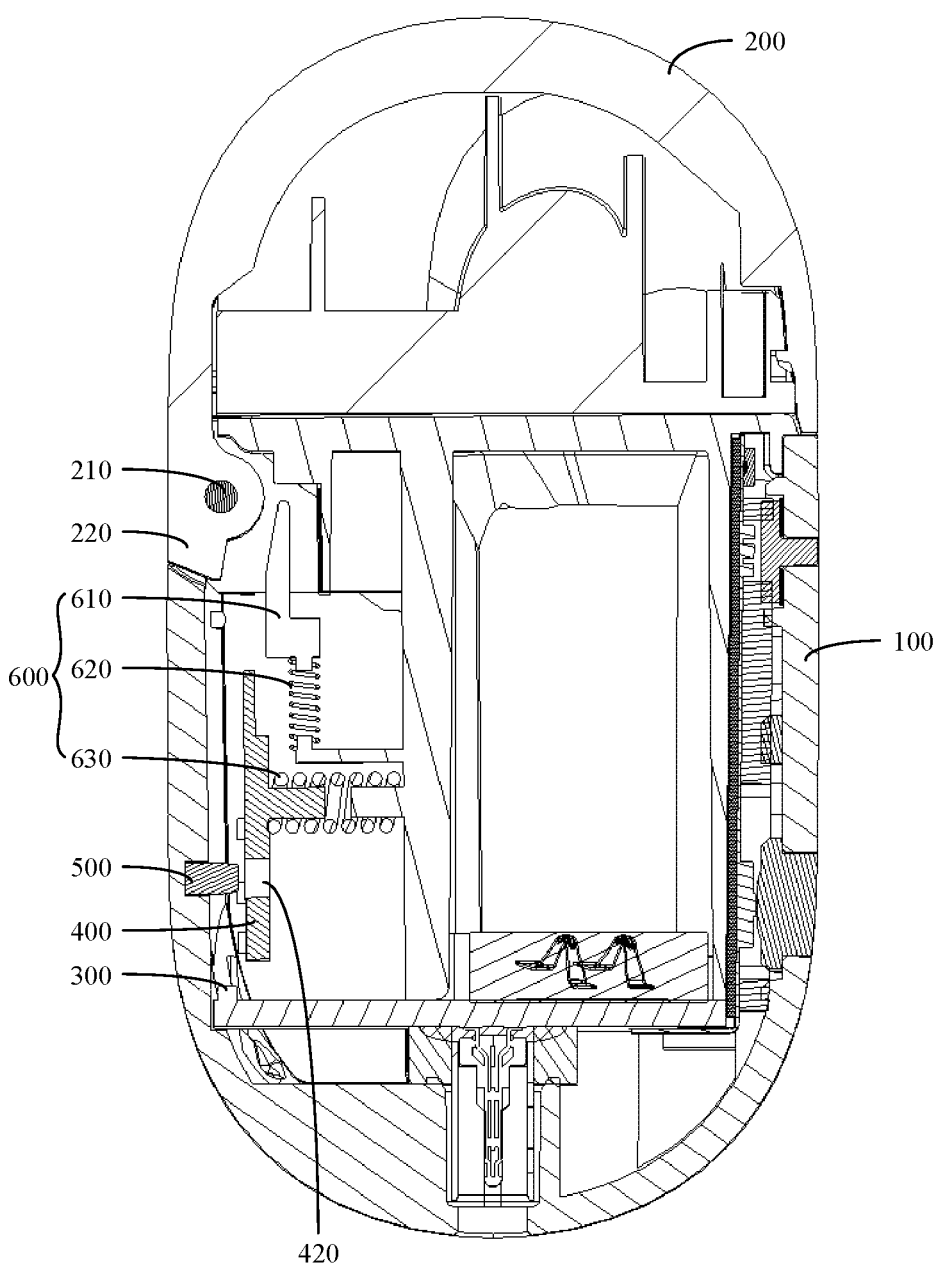
FIG. 1 and FIG. 2 are sectional views of a charging box in different states according to an embodiment of this application.
Figure 2:
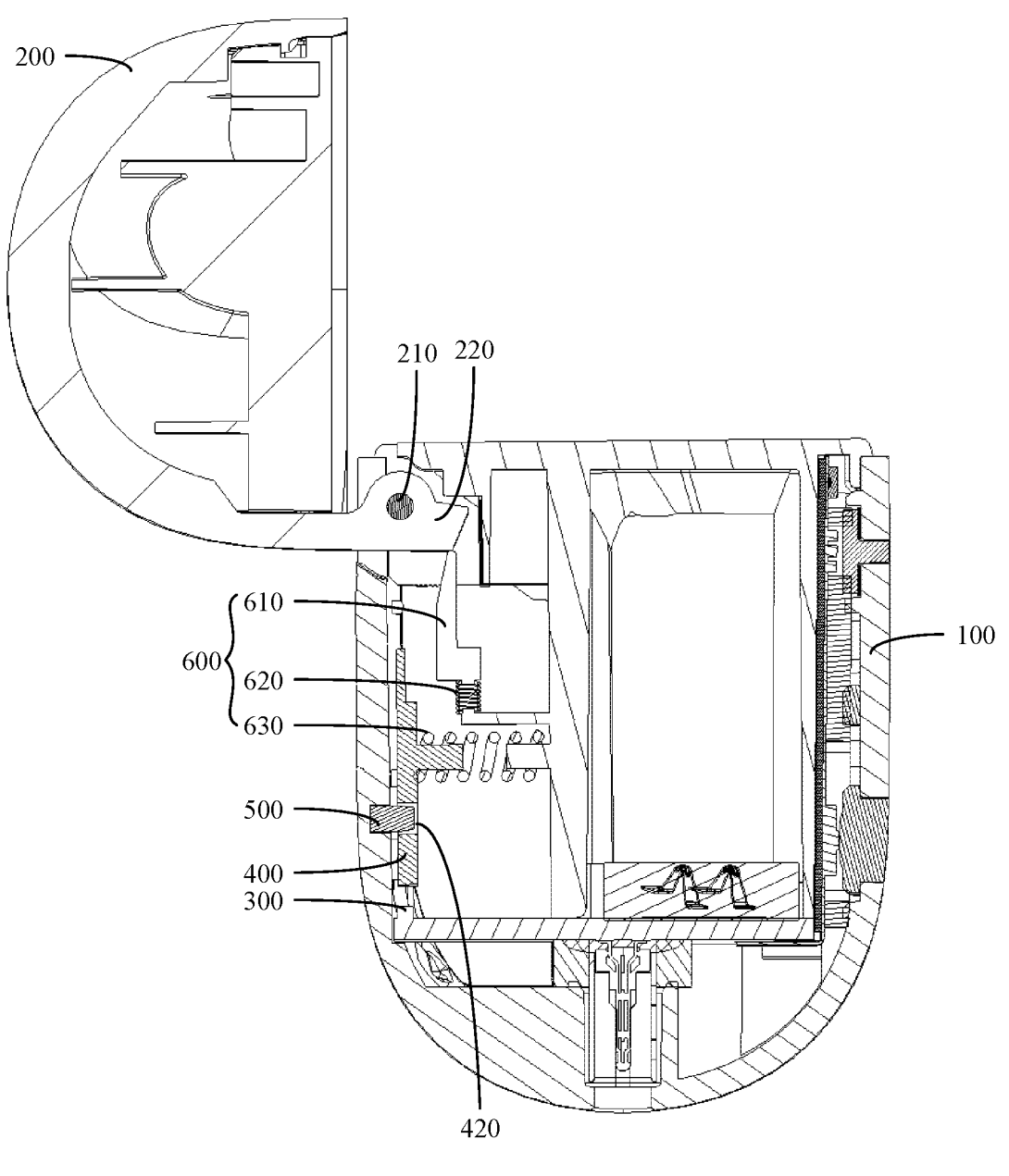
Figure 3:
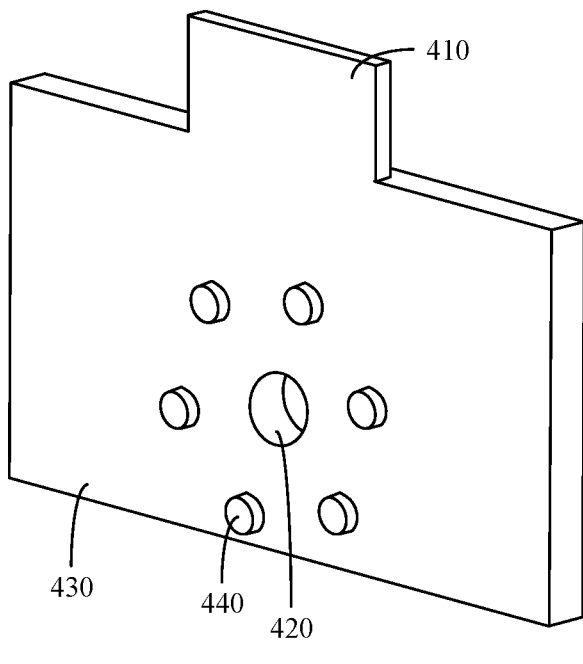
FIG. 3 is a schematic diagram of a structure of a first light guide member according to an embodiment of this application.
Figure 4:
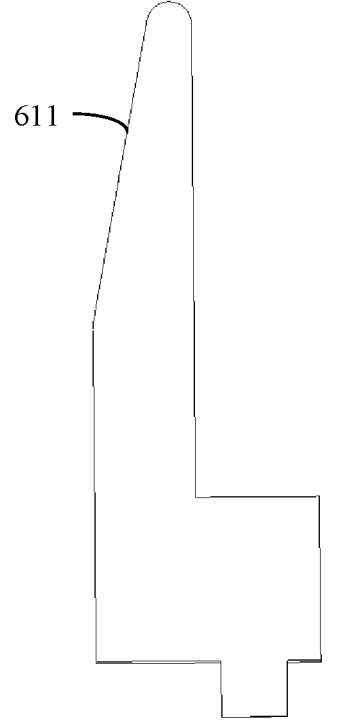
FIG. 4 is a schematic diagram of a structure of a magnetic driving member according to an embodiment of this application.

Referring to FIG. 1 to FIG. 4, an embodiment of this application discloses a charging box, which includes a box body 100, a cover body 200, and a light source 300.

The box body 100 can be used as a basic component of the charging box, and can provide an installation foundation for other components of the charging box. The box body 100 is provided with a first light-emitting area, the first light-emitting area allows light to pass through. Optionally, the whole box body 100 can be made of a material with specific light transmittance, and most areas of the box body 100 can be used as the first light-emitting area. Optionally, the box body 100 may be made of a light-tight material, the first light-emitting area may be arranged in some areas of the box body 100, and the first light-emitting area may be formed by opening.

The cover body 200 is rotatably connected to the box body 100. Optionally, the cover body 200 is hinged with box body 100, or the cover body 200 and the box body 100 can be connected by using a flexible material, so that the cover body 200 can rotate relative to the box body 100. When the cover body 200 is closed, the box body 100 and the cover body 200 enclose a closed space, thereby protecting components in the charging box and the wireless earphones; and when the cover body 200 is opened, the user can take out the wireless earphones in the box body 100, or put the wireless earphones in the box body 100, and can also perform operations such as pairing of the wireless earphones. Optionally, the cover body 200 is provided with a rotating shaft 210, and the cover body 200 is hinged with the box body 100 by using the rotating shaft 210.

The light source 300 is arranged in the box body 100. Optionally, the light source 300 can be a light source 300 that only emits visible light, a light source 300 that only emits invisible light such as infrared light, or a light source 300 that can emit infrared light and other light. Alternatively, a light-emitting surface of the light source 300 can face the first light-emitting area, so that the light emitted from the light source 300 can be directly emitted through the first light-emitting area.

In a case that the cover body 200 and the box body 100 form a first angle, light emitted from the light source 300 is exported through the first light-emitting area. The first angle herein can be an included angle between a plane where a port of the cover body 200 is located and a plane where a port of the box body 100 is located. The first angle can be greater than 0, and a specific value of the first angle can be flexibly selected. Optionally, the first angle can be an ultimate rotation angle formed when the cover body 200 is in an open state.

In this embodiment of this application, the box body 100 of the charging box is provided with the light source 300. When the user opens the cover body 200 to form the first angle relative to the box body 100, the light source 300 can emit light. The light can be exported through the first light-emitting area of the box body 100, so that the charging box has a light-emitting function, and functions of the charging box are more diversified.

In a further embodiment, the charging box further includes a driving chip, the driving chip is electrically connected to the light source 300, and the driving chip can drive the light source 300 to emit light with instruction information. In a case that the electronic device receives the light, the electronic device performs a target operation based on the instruction information. In a case that the cover body 200 and the box body 100 form the first angle, the driving chip drives the light source 300 to emit the light with instruction information. After the light is exported from the first light-emitting area, if the light is received by the electronic device, the electronic device can recognize the light, so as to perform the target operation based on the instruction information carried in the light. Optionally, the instruction information herein may include instruction information such as pairing the wireless earphones with the electronic device, obtaining a state parameter of the wireless earphones, and controlling an operating state of the wireless earphones. In this embodiment, the charging box is associated with the electronic device, and the driving chip can perform more complicated control operations, thus making the functions of the charging box more diversified. Moreover, the user can trigger the electronic device to perform the target operation only by opening the cover body 200. Therefore, the solution can be used to simplify operations between the charging box and the electronic device.

That the above instruction information includes pairing the wireless earphones with the electronic device is used as an example. When the cover body 200 and the box body 100 form the first angle, if the wireless earphones have not been paired with the electronic device, the pairing operation between the wireless earphones and the electronic device can be performed in this case. The electronic device has the ability to recognize the light emitted from the light source 300. Optionally, an ambient light sensor of the electronic device can recognize the infrared light emitted from the light source 300, so that the existing structure of the electronic device can be used to implement the pairing operation without improving the electronic device.

When the user needs to pair the wireless earphones with the electronic device, the user can open the cover body 200 to form the first angle relative to the box body 100. In this case, the driving chip can drive the light source 300 to emit infrared light, and the infrared light carries pairing information. When the infrared light reaches the electronic device, the electronic device can recognize the pairing information carried in the infrared light, so as to connect to corresponding charging box data for completing the pairing operation. Therefore, when pairing the wireless earphones, the user only needs to open the charging box, and rest operations are not required to be performed by the user. Therefore, in this embodiment, the pairing operation of the wireless earphones can be simplified, thereby shortening the time required for pairing. No matter whether the user pairs the wireless earphones with the electronic device for the first time, or changes a different electronic device to pair the wireless earphones with the new electronic device, the wireless earphones can be quickly paired with the electronic device. Even if there are a plurality of products around the electronic device that can be paired with the electronic device, the electronic device can quickly identify the wireless earphones that need to be paired, thus realizing rapid pairing of the wireless earphones.

It should be noted that the above pairing information may include address information of the wireless earphones. Before the wireless earphones leave the factory, address information (such as Bluetooth address) of each pair of wireless earphones can be stored in the system of the wireless earphones through a simple coding mode (such as a binary coding mode). When the light source 300 emits infrared light carrying the address information to the electronic device, the electronic device can parse the Bluetooth address of the wireless earphones, thereby automatically connecting to corresponding wireless earphones. Wireless earphones with a Bluetooth address of 12345 is used as an example. The Bluetooth address thereof can be coded as 000000000 0001 0010 0011 0100 0101 111111111, with the first nine zeros as a start sign and the last nine ones as an end sign. The data in the middle is the Bluetooth address of the wireless earphones. When the infrared light emitted from the light source 300 of the charging box is received by the ambient light sensor of the electronic device, the electronic device reads the data between the nine zeros and the nine ones and parses the data, so as to obtain the Bluetooth address of the wireless earphones, and then finds the corresponding wireless earphones and connects the wireless earphones based on the Bluetooth address.

Because the light emitted from the light source 300 is relatively scattered, in order to gather the light, and improve light-emitting efficiency, the charging box further includes a first light guide member 400, the first light guide member 400 is arranged in the box body 100, and in a case that the cover body 200 and the box body 100 form the first angle, a light-entering surface of the first light guide member 400 faces a light-emitting surface of the light source 300, and a light-emitting surface of the first light guide member 400 faces the first light-emitting area. The first light guide member 400 can converge light, so that more light emitted from the light source 300 can be emitted from the first light-emitting area, thereby improving light-emitting effect of the charging box.

The first light guide member 400 can be fixed in the box body 100, and in this case, the light-entering surface of the first light guide member 400 is always opposite to the light-emitting surface of the light source 300. By controlling whether the light source 300 emits light or not, the operating state of the charging box can be changed. However, after this arrangement, the light emitted from the light source 300 can only be conducted to the first light-emitting area, resulting in a low utilization rate of the light source 300. Based on this, the first light guide member 400 can be movably arranged in the box body 100, the charging box further includes a driving mechanism 600, the driving mechanism 600 is connected to the first light guide member 400, and the driving mechanism 600 drives the first light guide member 400 to move. In a case that the cover body 200 has a second angle relative to the box body 100, the light-entering surface of the first light guide member 400 is misaligned with the light-emitting surface of the light source 300. The second angle herein can be an included angle that is formed between a plane where a port of the cover body 200 is located and a plane where a port of the box body 100 is located and that is formed when the cover body 200 is closed relative to the box body 100. The second angle can be 0°. When the cover body 200 is closed relative to the box body 100, the charging box does not need to emit light through the first light-emitting area. In this case, the light-entering surface of the first light guide member 400 is misaligned with the light-emitting surface of the light source 300, so even if the light source 300 emits other pieces of light, these pieces of light will not be emitted through the first light guide member 400, thus ensuring that the light source 300 can also emit light in other states, and making the utilization rate of the light source 300 higher. Optionally, the light source 300 can emit red light, green light, and infrared light, so that different light effects can be generated in different scenarios.

In an optional embodiment, when the charging box does not emit light through the first light-emitting area, the light source 300 can emit light for indicating a charging state. In order to improve brightness of charging indication light emitted from the light source 300, the charging box further includes a second light guide member 500, and the second light guide member 500 is arranged in the box body 100. The box body 100 has a second light-emitting area, and a light-emitting surface of the second light guide member 500 faces the second light-emitting area. When the charging box is in the charging state, the charging indication light emitted from the light source 300 is exported through the second light guide member 500 and the second light-emitting area successively. It should be noted that the first light-emitting area and the second light-emitting area may at least partially overlap or not overlap at all. The second light guide member 500 herein can gather light, so that more pieces of charging indication light emitted from the light source 300 can be emitted, thereby improving brightness of the charging indication light.

In an embodiment, the second light guide member 500 can be arranged at a position far away from the first light guide member 400, so as to prevent the second light guide member 500 from affecting movement of the first light guide member 400. However, this arrangement will cause the second light guide member 500 to be too far away from the light source 300, which is not conducive for the charging indication light emitted from the light source 300 to be emitted through the second light guide member 500. Therefore, the first light guide member 400 can be provided with an avoidance hole 420, and at least part of the second light guide member 500 is located in the avoidance hole 420 in a case that the cover body 200 and the box body 100 form the first angle. Since the second light guide member 500 can be at least partially located in the avoidance hole 420, the second light guide member 500 will not affect movement of the first light guide member 400, so that the second light guide member 500 can be located close to the light source 300, thereby improving light-emitting effect of the charging indication light. For example, the light-entering surface of the second light guide member 500 can be enabled to face the light-emitting surface of the light source 300. In addition, in a case that the cover body 200 and the box body 100 form the first angle, a part of light emitted from the light source 300 can be emitted through the first light guide member 400, and another part of the light can be emitted through the second light guide member 500. Therefore, in this embodiment, light-emitting effect of the charging box can also be improved in this case.

The above driving mechanism 600 can be a component capable of outputting driving force, such as a motor. In other embodiments, the driving mechanism 600 includes a magnetic driving member 610, the magnetic driving member 610 is movably arranged in the box body 100, and the first light guide member 400 is provided with a magnetic portion 410. When the magnetic driving member 610 interacts with the magnetic portion 410, the first light guide member 400 moves. Since the magnetic driving member 610 and the magnetic portion 410 may not contact each other, the driving mechanism 600 is basically not worn due to the relative movement of components. As a result, the working life of the driving mechanism 600 is longer. Optionally, the magnetic portion 410 and other parts of the first light guide member 400 may be separately arranged or integrally formed.

Optionally, the magnetic driving member 610 can be an electromagnetic member, and the interaction between the magnetic driving member 610 and the magnetic portion 410 can be changed by turning on and off the magnetic driving member 610. Considering the problem of high power consumption caused by the electromagnetic member, in other embodiments, the interaction between the magnetic driving member 610 and the magnetic member 410 can be changed through rotation of the cover body 200. In this embodiment, a pressing portion 220 is arranged at a rotating shaft 210 of the cover body 200, and the magnetic driving member 610 is provided with a driving slope 611. Optionally, the driving slope 611 can be flat or curved. When the driving slope 611 is pressed, the force that the driving slope 611 receives can be decomposed into vertical and horizontal components, and the vertical and horizontal components can cause the magnetic driving member 610 to move, thereby changing a distance between the magnetic driving member 610 and the magnetic portion 410. In a case that the cover body 200 rotates in the first direction, the pressing portion 220 abuts against the driving slope 611, to drive the magnetic driving member 610 close to the magnetic portion 410, and in a case that a distance between the magnetic driving member 610 and the magnetic portion 410 is less than a first preset distance, the first light guide member 400 moves. The first direction herein can be a rotation direction of the cover body 200 when the cover body 200 is opened. With gradual opening of the cover body 200, the driving slope 611 is continuously pressed, so that the magnetic driving member 610 gradually approaches the magnetic portion 410. When the distance between the magnetic driving member 610 and the magnetic portion 410 is less than a first preset distance, magnetic fields thereof interact, thus generating a magnetic force. The magnetic force herein can be a magnetic repulsion force or a magnetic attraction force. This is not limited in this embodiment of this application.

Optionally, the first light guide member 400 can rotate or move, and the magnetic driving member 610 can also rotate or move. Relatively speaking, the space required for rotation is larger, so both the first light guide member 400 and the magnetic driving member 610 can be moved, and moving directions thereof can be vertical, thus improving a space utilization rate of the charging box.

In order to reset the magnetic driving member 610 more conveniently, the driving mechanism 600 further includes a first elastic member 620, one end of the first elastic member 620 is connected to the box body 100, and the other end of the first elastic member 620 is connected to the magnetic driving member 610. When the magnetic driving member 610 is pressed by the pressing portion 220 and moves, the first elastic member 620 is elastically deformed. When the pressing portion 220 no longer presses the magnetic driving member 610, the first elastic member 620 recovers from deformation, thereby driving the magnetic driving member 610 to reset, so as to facilitate next movement of the magnetic driving member 610.

Similarly, the driving mechanism 600 further includes a second elastic member 630, one end of the second elastic member 630 is connected to the box body 100, and the other end of the second elastic member 630 is connected to the first light guide member 400. When the first light guide member 400 is driven by the magnetic driving member 610 to move, the second elastic member 630 is elastically deformed. When the magnetic driving member 610 no longer applies magnetic force to the first light guide member 400, the second elastic member 630 recovers from deformation, thereby driving the first light guide member 400 to reset, so as to facilitate next movement of the first light guide member 400.

Optionally, both the first elastic member 620 and the second elastic member 630 may be springs.

Because an angle of the light emitted from the light source 300 is small, it requires the user to aim the first light-emitting area at the electronic device, so that the electronic device can reliably receive the light emitted from the light source 300, which will be inconvenient for the user to operate. Therefore, in order to facilitate operation of the user, the first light guide member 400 may include a disc-shaped portion 430 and a plurality of light guide columns 440, the light guide columns 440 are arranged on the disc-shaped portion 430 at intervals, and the first light-emitting area is arranged corresponding to the light guide columns 440. Optionally, the first light-emitting area may be a complete area opposite to all the light guide columns 440, or may be a plurality of discrete areas, and these first light-emitting areas may be arranged in a one-to-one correspondence with the light guide columns 440. After this arrangement, the light emitted from the light source 300 can be simultaneously emitted through the plurality of light guide columns 440, so the light can easily reach the electronic device, and the user does not need to accurately aim at the first light-emitting area and the electronic device, thus facilitating the operation of the user. In addition, compared with a ring-shaped light guide structure, the plurality of light guide columns 440 are dispersed to realize large-angle light emission, which can reduce the material of the light guide structure, thereby reducing the cost of the first light guide member 400.

Further, optionally, when the first light guide member 400 is provided with the avoidance hole 420, each light guide column 440 can be arranged around the first light guide member 400, so that the first light guide member 400 can emit light more evenly.

An embodiment of this application also discloses an earphone assembly, which includes wireless earphones and the charging box described in any one of the above embodiments. The wireless earphones can be stored in the charging box and electrically connected to the charging box, and the wireless earphones can be paired with the electronic device through the charging box.

An embodiment of this application further discloses a charging box control method, and the control method is applied to the charging box according to any one of the above embodiments and includes the following steps.

S100. In a case that a cover body 200 and a box body 100 form a first angle, a light source 300 is controlled to emit light, and in a case that an electronic device receives the light, the electronic device performs an operation corresponding to the light. Optionally, the operation that is performed by the electronic device and that is corresponding to the light may be unrelated to the charging box and the wireless earphones, such as waking up a screen of the electronic device, adjusting a volume of the electronic device, and the like. Certainly, it may also be related to the charging box and the wireless earphones, such as pairing the wireless earphones with the electronic device, obtaining a state parameter of the wireless earphones, controlling an operating state of the wireless earphones, and the like.

After this control method is used, the charging box is associated with the electronic device, and the light emitted from the charging box can be used to realize more functions, thus making functions of the charging box more diversified. Moreover, the user can trigger the electronic device to perform the operation corresponding to the light only by opening the cover body 200. Therefore, the solution can be used to simplify operations between the charging box and the electronic device.

Further, the light emitted from the light source 300 carries instruction information. In a case that the electronic device receives the light, the electronic device performs a target operation corresponding to the instruction information. In this embodiment, the electronic device can be used to implement related control operations on the charging box, thereby further reducing control links that require manual participation of the user, and simplifying the operation of the charging box.

Further, in an optional embodiment, the instruction information may include pairing information, and in a case that the electronic device receives the light, the electronic device is connected to corresponding charging box data based on the pairing information. When pairing the wireless earphones by using this control method, the user only needs to open the charging box, and rest operations are not required to be performed by the user. Therefore, in this embodiment, the pairing operation of the wireless earphones can be simplified, thereby shortening the time required for pairing.

An embodiment of this application further discloses an electronic device control method, where the method includes the following steps.

S200: Receive light emitted from a charging box, where the light carries pairing information.

The light emitted from a light source 300 of the charging box carries the pairing information, so when the light reaches an electronic device, the pairing information carried in the light can be parsed by the electronic device.

S300. In response to the pairing information, turn on Bluetooth.

When the electronic device parses the pairing information, it means that a user needs to pair the wireless earphones with the electronic device, and then the Bluetooth of the electronic device can be turned on, so as to facilitate data connection between the wireless earphones and the electronic device through the Bluetooth.

S400. Perform data connection with a corresponding charging box based on the pairing information.

Because the electronic device can automatically turn on the Bluetooth in response to the pairing information, the user can keep the Bluetooth in an off state when using the electronic device, regardless of whether the user needs to pair the wireless earphones with the electronic device, thereby reducing power consumption of the electronic device without affecting a pairing operation between the wireless earphones and the electronic device. Certainly, if the wireless earphones are disconnected from the electronic device, the electronic device can further automatically turn off the Bluetooth to further reduce power consumption.

An embodiment of this application further discloses a control apparatus of a charging box, and the control apparatus is applied to the control method according to any one of the above embodiments. The control apparatus includes a control module, and the control module is configured to: in a case that a cover body 200 and a box body 100 form a first angle, control a light source 300 to emit light, and in a case that an electronic device receives the light, the electronic device performs an operation corresponding to the light. The control apparatus is used, so that the charging box is associated with the electronic device, and the light emitted from the charging box can be used to realize more functions, thus making functions of the charging box more diversified. Moreover, the user can trigger the electronic device to perform the operation corresponding to the light only by opening the cover body 200. Therefore, the solution can be used to simplify operations between the charging box and the electronic device.

Optionally, the control module is configured to: in a case that the cover body 200 and the box body 100 form the first angle, control the light source 300 to emit light with instruction information. In a case that the electronic device receives the light, the electronic device performs an operation corresponding to the instruction information, so that the electronic device carries out a relevant control operation on the charging box, thereby further simplifying operations of the charging box.

Further, optionally, in order to realize the pairing operation between the wireless earphones and the electronic device more conveniently, the control module is configured to: in a case that the cover body 200 and the box body 100 form the first angle, control the light source 300 to emit light with paring information. In a case that the electronic device receives the light, the electronic device is connected to corresponding charging box data based on the pairing information.

An embodiment of this application further provides a charging box. The charging box includes a processor, a memory, and a program or an instruction stored in the memory and executable on the processor, where when the program or the instruction is executed by the processor, steps of the control method according to any one of the above embodiments are implemented. The processor is configured to: in a case that the cover body 200 and the box body 100 form the first angle, control the light source 300 to emit light. In a case that the electronic device receives the light, the electronic device performs an operation corresponding to the light, thus making functions of the charging box more diversified, and simplifying operations between the charging box and the electronic device.

An embodiment of this application further discloses a readable storage medium, where the readable storage medium stores a program or an instruction, and the program or the instruction is executed by a processor to implement steps of the control method according to any one of the above embodiments.

The processor is a processor in the charging box in the foregoing embodiment. The readable storage medium includes a computer-readable storage medium, such as a computer read-only memory (ROM), a random access memory (RAM), a magnetic disk, or an optical disc.

An embodiment of this application also provides a chip, where the chip includes a processor and a communications interface, and the communications interface is coupled to the processor. The processor is configured to run a program or an instruction to implement the processes of the foregoing charging box control method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

What is claimed is:

1. A charging box, comprising:
a box body, wherein the box body is provided with a first light-emitting area;
a cover body, wherein the cover body is rotatably connected to the box body; and
a light source, wherein the light source is arranged in the box body, wherein
in a case that the cover body and the box body form a first angle, light emitted from the light source is exported through the first light-emitting area;
the charging box further comprises a driving chip, the driving chip is electrically connected to the light source, the driving chip drives the light source to emit the light with instruction information, and in a case that an electronic device receives the light, the electronic device performs a target operation based on the instruction information.

2. The charging box according to claim 1, wherein the charging box further comprises a first light guide member, the first light guide member is arranged in the box body, and in a case that the cover body and the box body form the first angle, a light-entering surface of the first light guide member faces a light-emitting surface of the light source, and a light-emitting surface of the first light guide member faces the first light-emitting area.

3. The charging box according to claim 2, wherein the first light guide member is movably arranged in the box body, the charging box further comprises a driving mechanism, the driving mechanism is connected to the first light guide member, and the driving mechanism drives the first light guide member to move; and
in a case that the cover body and the box body form a second angle, the light-entering surface of the first light guide member is misaligned with the light-emitting surface of the light source.

4. The charging box according to claim 3, wherein the charging box further comprises a second light guide member, the second light guide member is arranged in the box body, the box body is provided with a second light-emitting area, and a light-emitting surface of the second light guide member faces the second light-emitting area; and
in a case that the charging box is in a charging state, charging indication light emitted from the light source is exported through the second light guide member and the second light-emitting area successively.

5. The charging box according to claim 4, wherein the first light guide member is provided with an avoidance hole, and at least part of the second light guide member is located in the avoidance hole in a case that the cover body and the box body form the first angle.

6. The charging box according to claim 3, wherein the driving mechanism comprises a magnetic driving member, the magnetic driving member is movably arranged in the box body, the first light guide member is provided with a magnetic portion, and the first light guide member moves in a case that the magnetic driving member interacts with the magnetic portion.

7. The charging box according to claim 6, wherein a pressing portion is arranged at a rotating shaft of the cover body, the magnetic driving member is provided with a driving slope, in a case that the cover body rotates in the first direction, the pressing portion abuts against the driving slope, to drive the magnetic driving member close to the magnetic portion, and in a case that a distance between the magnetic driving member and the magnetic portion is less than a first preset distance, the first light guide member moves.

8. The charging box according to claim 6, wherein the driving mechanism further comprises a first elastic member, one end of the first elastic member is connected to the box body, and the other end of the first elastic member is connected to the magnetic driving member; and/or the driving mechanism further comprises a second elastic member, one end of the second elastic member is connected to the box body, and the other end of the second elastic member is connected to the first light guide member.

9. The charging box according to claim 2, wherein the first light guide member comprises a disc-shaped portion and a plurality of light guide columns, the light guide columns are arranged on the disc-shaped portion at intervals, and the first light-emitting area is arranged corresponding to the light guide columns.

10. An earphone assembly, comprising wireless earphones and the charging box according to claim 1, and the wireless earphones can be stored in the charging box and electrically connected to the charging box.

11. A charging box control method, applied to the charging box according to claim 1, and comprising:

in a case that a cover body and a box body form a first angle, controlling a light source to emit light, wherein in a case that an electronic device receives the light, the electronic device performs an operation corresponding to the light.

12. The control method according to claim 11, wherein light emitted from the light source carries instruction information, and in a case that the electronic device receives the light, the electronic device performs a target operation corresponding to the instruction information.

13. The control method according to claim 12, wherein the instruction information comprises pairing information, and in a case that the electronic device receives the light, the electronic device is connected to corresponding charging box data based on the pairing information.

14. A charging box, comprising a processor, a memory, and a program or an instruction stored in the memory and executable on the processor, wherein when the program or the instruction is executed by the processor, steps of the control method according to claim 11 are implemented.

15. The charging box according to claim 14, wherein the light emitted from the light source carries instruction information, and in a case that the electronic device receives the light, the electronic device performs a target operation corresponding to the instruction information.

16. The charging box according to claim 15, wherein the instruction information comprises pairing information, and in a case that the electronic device receives the light, the electronic device is connected to corresponding charging box data based on the pairing information.

17. A non-transitory readable storage medium, wherein the non-transitory readable storage medium stores a program or an instruction, and when the program or the instruction is executed by a processor, steps of the control method according to claim 11 are implemented.

18. The non-transitory readable storage medium according to claim 17, wherein the light emitted from the light source carries instruction information, and in a case that the electronic device receives the light, the electronic device performs a target operation corresponding to the instruction information.

19. A chip, wherein the chip comprises a processor and a communications interface, the communications interface is coupled to the processor, and the processor is configured to run a program or an instruction to implement the control method according to claim 11.

* * * * *